United States Patent [19]
Kato et al.

[11] Patent Number: 4,933,885
[45] Date of Patent: Jun. 12, 1990

[54] PLANT MONITORING SYSTEM

[75] Inventors: Masami Kato, Inazawa; Shiro Matsumura, Chita; Yoichi Isaji, Nagoya; Mihoko Adachi, Fuchu; Hiroji Fukui, Tachikawa; Shinji Nishikawa, Fuchu; Katsuro Momoeda, Kamakura; Tetsuo Mozai, Kitamoto, all of Japan

[73] Assignees: Kabushiki Kaisha Toshiba, Kawasaki; Chuba Electric Power Co., Ltd., Nagoya, both of Japan

[21] Appl. No.: 181,995

[22] Filed: Apr. 15, 1988

[30] Foreign Application Priority Data

Apr. 15, 1987 [JP] Japan ................................. 62-90717

[51] Int. Cl.[5] ...................... G06F 15/46; G06F 3/153
[52] U.S. Cl. .............................. 364/551.01; 364/492; 364/494; 340/721
[58] Field of Search ............... 364/551, 492–495, 364/551.01, 551.02; 340/713, 721, 825.06, 825.36

[56] References Cited

U.S. PATENT DOCUMENTS 4,280,060  7/1981  Kure-Jensen et al. ............. 364/494
4,550,379 10/1985  Kawai et al. ...................... 364/494
4,563,746  1/1986  Yoshida et al. .................... 364/551
4,707,778 11/1987  Yamada et al. .................... 364/494
4,712,191 12/1987  Penna ................................ 340/721
4,742,445  5/1988  Watanabe .......................... 364/492
4,783,648 11/1988  Homma et al. .................... 340/721
4,806,919  2/1989  Nakayama et al. ................ 340/721

Primary Examiner—Parshotam S. Lall
Assistant Examiner—Christopher L. MaKay
Attorney, Agent, or Firm—Foley & Lardner, Schwartz, Jeffery, Schwaab, Mack, Blumenthal & Evans

[57] ABSTRACT

A plant monitoring system having a memory unit for storing process variables and relationship data between main monitor screens and sub-monitor screens, a display unit including a main display area, an auxiliary display area, a main monitor screen selection area, a sub-monitor screen selection area and an alarm occurrence display area, and a control unit for controlling the whole system. By requesting from the main monitor screen selection area, a main monitor screen is usually displayed in the main display area, and one of the related sub-monitor screens is displayed in the sub-monitor screen area upon an operator's request from the already displayed sub-monitor screen selection area. When an alarm occurs, an alarm screen is displayed in the main displayed area.

3 Claims, 14 Drawing Sheets

FIG. 9

| | 1st BEARING | 2nd BEARING | 3rd BEARING | 4th BEARING | 5th BEARING | 6th BEARING | 7th BEARING | 8th BEARING |
|---|---|---|---|---|---|---|---|---|
| | ◎ | △ | ○ | ○ | | | | |
| | △ | ◎ | ○ | ○ | | | | |
| | ○ | ○ | ◎ | △ | | | | |
| | | | △ | ◎ | ○ | ○ | | |
| | | | ○ | ○ | ◎ | △ | | |
| | | | ○ | ○ | △ | ◎ | | |
| | | | | | ○ | ○ | ◎ | △ |
| | | | | | ○ | ○ | △ | ◎ |

FIG. 12

| | BLINKING (RED) | TURN ON (RED) | TURN OFF (GREEN) |
|---|---|---|---|
| 41 ─ ALARM | WHEN SYSTEM IS BROUGHT INTO ALARM STATE AND ALARM SCREEN IS DISPLAYED ON MAIN DISPLAY AREA | WHEN TOUCHED AS ACKNOWLEDGING OPERATION BY OPERATOR FOR ALL SCREENS IN ALARM STATE | WHEN ALL ALARM STATES DISAPPEAR |
| 42 ─ ALARM STANDBY | | WHEN ANOTHER SCREEN IS FURTHER BROUGHT INTO ALARM STATE DURING BLINKING OF ALARM | WHEN ANY UNACKNOWLEDGED ALARM SCREEN NOT DISPLAYED ON TUBE SURFACE DISAPPEARS |

PLANT MONITORING SYSTEM

BACKGROUND OF THE INVENTION

This invention relates to a plant monitoring system for displaying a process variable of a plant as a pictorial image on a display unit to thereby supervise or monitor the process variable.

For example, in a power generation plant, monitoring controls using a CRT display unit are widely adopted with the view of reducing the load on an operator and/or for improvement in the monitoring efficiency. For the content to be monitored, importance is attached to the monitoring of an operating process where the plant is in an unstable state, e.g., from startup of the power generation plant to ordinary operation thereof and/or from ordinary operation to shutdown of generation. Accordingly, there are provided many monitor screens for the unit of events or unit of systems adapted to the operating process. Such a monitoring system is exclusively directed to support of an operator with a view to stably operating the plant. In the event that any abnormal condition occurs, the investigation of the cause is ordinarily conducted by analyzing data such as plant data, afterwards. It is the present state of the art that detailed supervision up to such a level to investigate the cause on-line simultaneously with supervisory control of the operation cannot be carried out. Particularly, in a thermal power plant, as the profile of the power demand changes, plants in which daily startup and shutdown (DSS) use must be conducted for adjustment of the difference between power consumptions in the daytime and at night are increasing. In such plants, the states where plants become most unstable, such as startup and shutdown must be frequently repeated. Thus, more careful supervision than ever before becomes necessary. Such more careful supervision implies the feasibility of supervision having adaptability, or supervision capable of supporting abnormal cause diagnosis in an abnormal condition. To realize this, it is required to analyze one object to be supervised or monitored from every point of view, to conduct supervision while comparing individual objects to be supervised. Thus, the contents set for the monitor screen would increase and reach detailed levels.

The improvement in the ability of computers makes it possible to immediately analyze a great deal of data and to cope with an increase in the volume of data handled. However, unless an operator can effectively use such information, it will be dead or ineffective information. According as more careful supervision is required to a great extent, analysis of data becomes indispensable. In some cases, professional knowledge at the analytical level also becomes necessary. It is predicted that such supervision using analytical data will be increasingly needed in future. For effectively using such data on-line by an operator in the same manner as in conventional supervision, how such data is to be presented is a problem. Namely, data which is abundant and of detailed levels cannot be effective information until an operator comprehends it and handles it in conformity with the operation of the plant.

SUMMARY OF THE INVENTION

An object of this invention is to provide a plant monitoring system capable of supplying sufficient effective information to an operator.

This object and other objects are accomplished by the plant monitoring system described below. Main monitor screens capable of roughly grasping or recognizing the entirety of items to be monitored determined in advance from the view point of supervision of a plant are provided. In addition, submonitor screens capable of grasping or recognizing the contents of the main monitor screens in correspondence therewith are provided. A storage unit for memorizing information for these monitor screens in advance is provided. There is provided a display unit for displaying pictorial images of these monitor screens on divided display areas thereof and a pictorial image of a command section interactive with an operator. An input unit where an operator designates the pictorial image of the command section displayed on the display unit is provided. In addition, there is provided means for displaying information related to screens for supervising or monitoring process variables when a main process variable of the plant is placed in an alarm state.

When an operator displays a pictorial image of a plant monitoring system on the basis of picture information thereof memorized in the storage unit, he designates the pictorial image of the command section displayed on the display unit to conduit that display on a predetermined display area. When an alarm is produced, identification of the alarm screen and/or re-checking of the alarm screen identified are/is also conducted by designating the pictorial image of the command section using the input unit.

Thus, an operator can supervise or monitor the plant based on the selection of an arbitrary monitor screen and the operation by an operator can be made through the input unit with the display unit being used as the main tool. Further, since the display area is divided, there are much information contents which can be displayed on a single cathode ray tube (CRT) and the processing when an alarm is generated can be suitably executed. Furthermore, the selection of monitor screens is entirely made by designating predetermined positions on the tube without switching to a menu screen, whereby a screen to be watched or information to be obtained can be called by one-touch operation.

The monitor screen system employed in this invention is constructed in consideration of correlations between process variables to be supervised, thereby making it possible to provide information for monitoring means or groups of monitor screens to be closely watched by an operator. This increases the opportunity for early discovery of the cause of an abnormal condition. Further, one display unit is divided into a plurality of areas as stated above and thus all requests given by an operator can be visually satisfied on the screen of the display tube. Accordingly, the plant supervising equipment of this invention operates so that continuous supervision is realized in consideration of the coexistence of information automatically output from the system and a command based on a request from an operator, thus allowing for improvement in supervision efficiency.

A preferred embodiment of this invention will be described with reference to the accompanying drawings.

BRIEF DESCRIPTION OF THE DRAWINGS

In the accompanying drawings:

FIG. 9 is an explanatory view showing the combination of turbine bearings at the time of an automatic selection;

FIG. 12 is an explanatory view showing the contents displayed on a warning occurrence condition display area;

DETAILED DESCRIPTION OF THE PREFERRED EMBODIMENT

Figure 1:
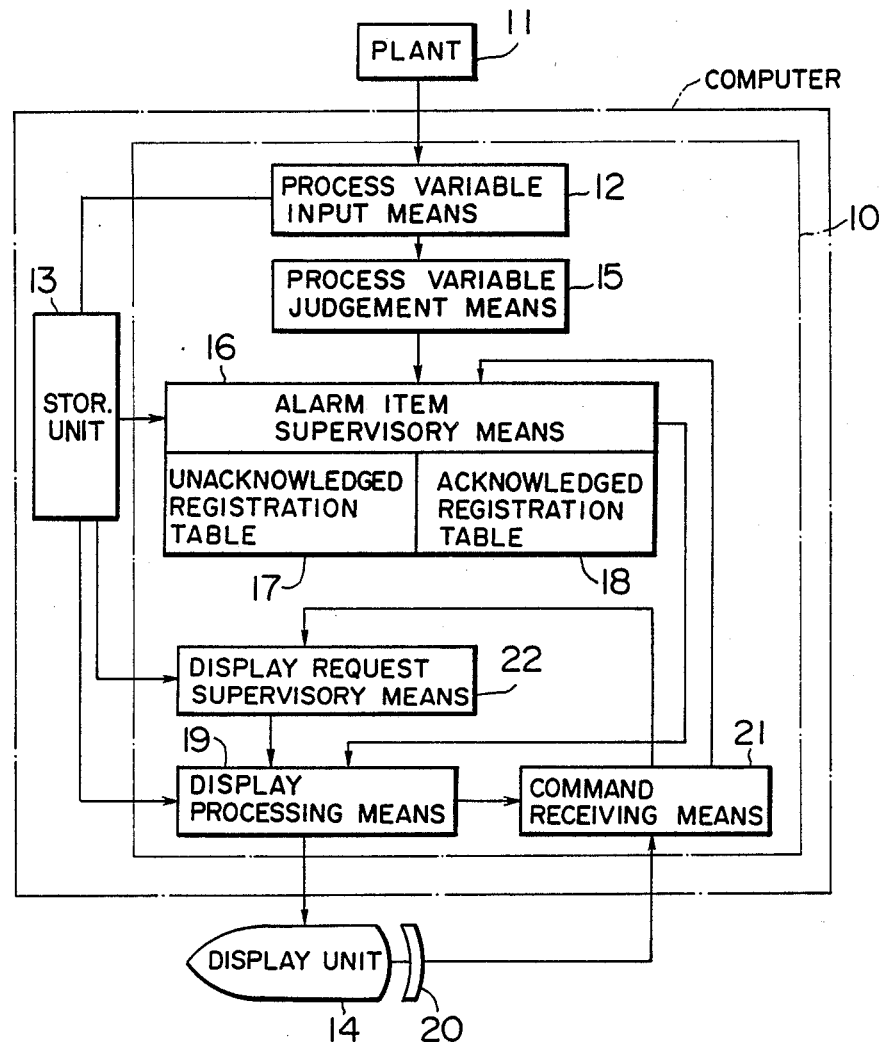
FIG. 1 is a block diagram showing a plant monitoring system according to this invention.

An embodiment of this invention will be described with reference to the attached drawings. FIG. 1 is a block diagram showing a plant monitoring system according to this invention. The plant monitoring system of the invention comprises a computer system.

Process variables from a plant 11 are scanned by process variable input means 12 and are then stored as process data in a storage unit 13. The storage unit 13 stores process data which has been read through the process variable input means 12 and also stores screen data for displaying the process data. Namely, the storage unit 13 stores data for a plurality of monitor screens displayed on a display unit 14 and also stores data indicative of correlations between a plurality of monitor screens (images of the monitoring system).

Figure 2:
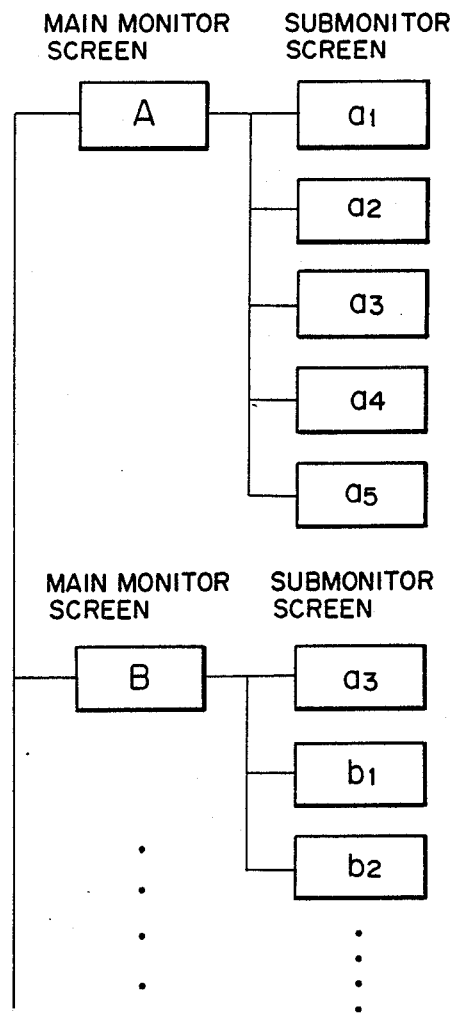
FIG. 2 is an explanatory view of a monitor screen system employed in this invention.

FIG. 2 is an explanatory view showing the correlations between monitor screens (images of the monitoring system) wherein monitor screens related to a specified main screen (which will be referred to as a "main monitor screen" hereinafter) are grouped with respect to the main monitor screen and such screens in a group will be called sub-monitor screens. The main monitor screens are provided for every item to be monitored in the plant and the sub-monitor screens display thereon detailed information of items to be monitored. Namely, A and B represent a main monitor screen and ai (i=1 to 5) and bj (j=1, 2) represent sub-monitor screens related to the respective main monitor screens. In this example, the sub-monitor screen a3 of the main monitor screen A also serves as the sub-monitor screen of the main monitor screen B. As shown in this example, it is not required that groups of sub-monitor screens corresponding to respective items to be monitored be mutually exclusive.

This is because for instance, when any abnormal condition occurs in connection with the items to be monitored represented by the main monitor screen B, there are instances where the cause of the abnormal condition appears in the monitored content of the sub-monitor screen a3 giving detailed information of the monitored items represented by the main monitor screen A.

As above, the main monitor screen is a monitor-screen which can roughly grasp the entirety of items to be monitored among the groups of monitor screens allocated every item to be monitored, and the sub-monitor screen is a monitor screen which displays the details of the content of the main monitor screen, provides information related thereto, or displays the same process variable from a different point of view by changing the parameter. The data concerning the relationships between mutual monitor screens are stored in the storage unit 13.

Then, process variable judgement means 15 reads thereinto process variables to be supervised for each operation stage through the process variable input means 12 to judge whether or not it falls within a normal range. For a reference for this judgement, a value equivalent to an alarm level which corresponds to a limit value of an allowed range in operating the plant as a limit value in dependence upon a process variable is set in advance. When a process variable deviates from the limit value thus set, the process variable judgement means 15 informs the alarm item supervisory means 16 of the occurrence of an alarm together with a title for an input point of the process variable. In addition, also when the alarm is released, the judgement means 15 informs the alarm item supervisory means 16 of the warning.

The alarm item supervisory means 16 has two Tables to supervise the condition of an occurrence of an alarm. Namely, it has a registration Table 17 indicating that the occurrence of an alarm is unacknowledged and a registration Table 18 indicating that occurrence of an alarm has been already acknowledged. When information indicating occurrence of an alarm is received from the process variable judgement means 15, a screen number of a screen for monitoring that process variable where an alarm has occurred (which will be referred to as an "alarm screen" hereinafter) is first registered in the unacknowledged registration Table 17. Then, a request for display of the monitor screen of the screen number registered is sent to display processing means 19, to display the pictorial image of that monitor screen on the display unit 14. It is to be noted that when there are a plurality of alarm screens, a test to register and display them in the order of occurrence of alarms is conducted, which will be described later.

When a pictorial image of a monitor screen for monitoring the process variable in which an alarm has occurred is displayed on the display unit 14, an operator confirms that he has recognized that the process variable is in an alarm condition. Such an acknowledgement or confirmation is conducted using the input unit 20 provided in association with the display unit 14. Upon receiving this confirmation, it is transmitted to the alarm item supervisory means 16 through command receiving means 21. Thus, the alarm item supervisory means 16 deletes the screen number registered in the unacknowledged registration Table 17 to register that number in the acknowledged registration Table 18. Where there are a plurality of alarm screens, a pictorial image of the next alarm screen is displayed on the display unit 14. It is to be noted that where the alarm condition of the process variable is released, these screen numbers registered in the registration Tables 17 and 18 are both deleted. Namely, the unacknowledged registration Table 17 is a registration Table for an alarm screen which has not been yet identified by an operator and the acknowledged registration Table 18 is a registration Table for an alarm screen which has been already acknowledged by an operator but in which the alarm condition has not been yet released.

Then, the command receiving means 21 receives acknowledgement of the alarm screen, as described above, and also receives, on the other hand, a screen select command (display request) by an operator through the input unit 20. Namely, the command receiving means 21 receives, through the input unit 20, a command for displaying a pictorial image of a specified screen from among various kinds of monitor screens stored as picture information in the storage unit 13. Upon receiving this screen select command, the command receiving means 21 activates display request supervisory means 22 to take out necessary data from the storage unit 13 in dependence upon the content of the command to display a pictorial image of a screen corresponding to the command from the operator on the display tube surface of the display unit 14 by means of display processing means 19. In this example, where the display request by the operator and the display request for an unacknowledged alarm screen by the above-mentioned alarm item supervisory means 16 compete with each other, the display of the alarm screen has priority over other requests.

The elements 12, 15, 16, 17, 18, 19, 21 and 22 constitute a controller 10.

Figure 3:
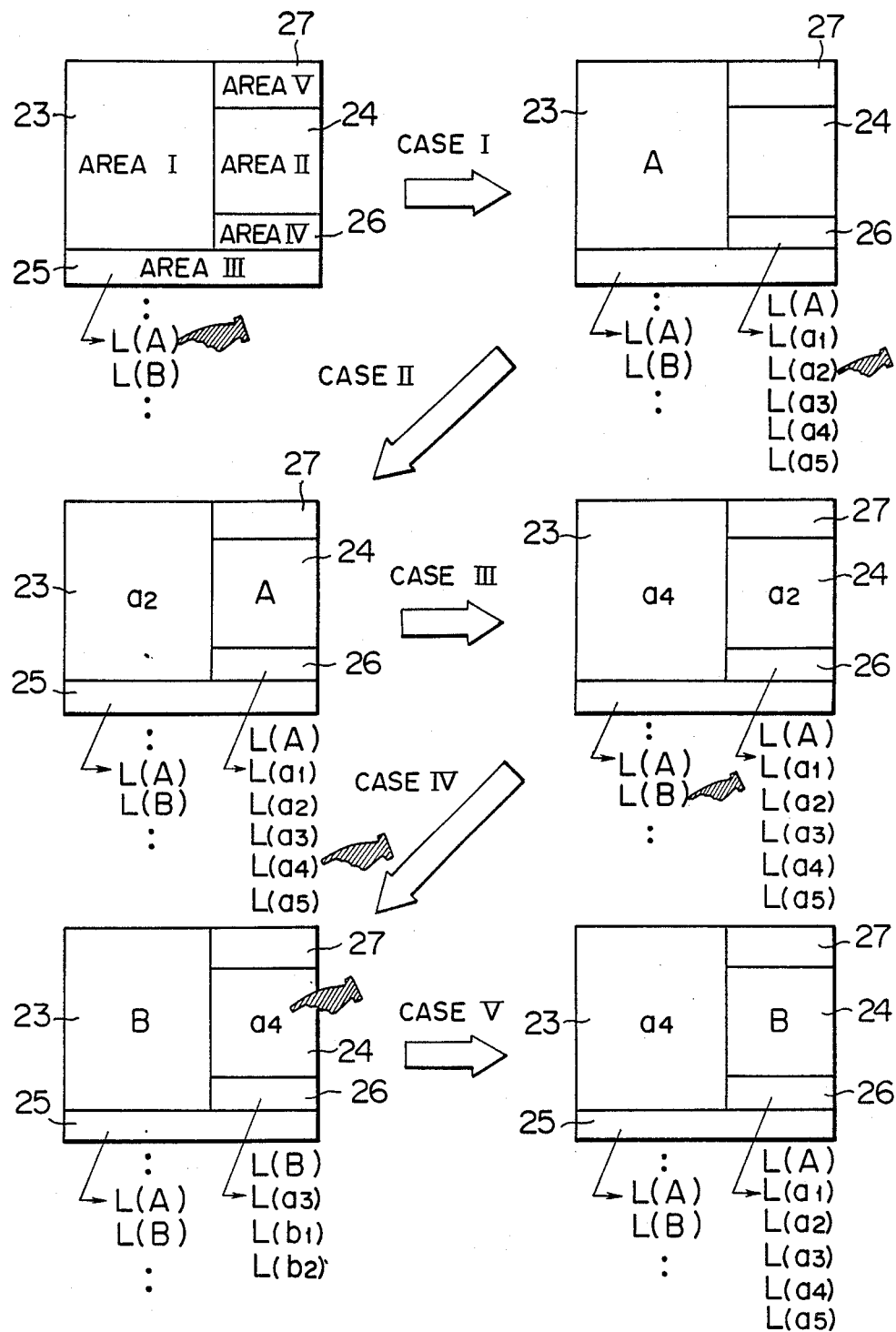
FIG. 3 is an explanatory view showing how a pictorial image of a monitor screen is displayed.

FIG. 3 is an explanatory view when pictorial image of various monitor screens stored a picture information in the storage unit 13 are displayed on the display unit 14 by an operator. The display tube surface of the display unit 14 is divided into five areas: a main display area 23, an auxiliary display area 24, a main monitor screen selection area 25, the sub-monitor screen selection area 26, and an alarm occurrence condition display area 27.

The main display area 23 is an area for displaying a pictorial image of an alarm screen specified by the alarm item supervisory means 16 when a monitor screen requested by an operator or a process variable is brought into an alarm condition. This area is made up as the largest area on the display tube.

The auxiliary display area 24 is an area for displaying at a reduced or contracted size a pictorial image of a monitor screen selected by an operator of pictorial images of the monitor screens displayed on the main display area 23. In addition, this area is also utilized for expanded display of the pictorial image of the monitor screen which has been contraction-displayed on the auxiliary display area 24, on the main display area 23 for a second time. This is carried out in response to a command from the input unit 20 by means of the display request supervisory means 22 and the display processing means 19.

The main monitor screen select area 25 is an area on which labels for selecting main monitor screens representative of respective items to be monitored are displayed. A specified label is designated by the input unit 20, whereby a pictorial image of a main monitor screen corresponding thereto is displayed on the main display area 23.

The sub-monitor screen select area 26 is an area on which labels for selecting individual monitor screens of a group of screens in dependence upon that group of monitor items to be monitored displayed on the main display area 23 to which the monitor screen belongs are displayed. For example, assuming that discrimination labels of the main screens A and B, and sub-monitor screens ai (i=1 to 5) and bj (j=1, 2) are designated at L(A), L(B), L(ai) (i=1 to 5) and L(bj) (j=1, 2), respectively, where the pictorial image of the main screen A is displayed on the main display area 23, L(A) and L(ai) (i=1 to 5) are displayed on the sub-monitor screen select area 26. In this condition, when a pictorial image of the main monitor screen B belonging to any other group of monitor screens is then displayed, the content of the sub-monitor screen select area 26 is switched. Thus, L(B) and L(bj) (j=1, 2) are displayed. A specified level of respective labels displayed on the sub-monitor screen select area 26 is designated by the input unit 20, whereby a pictorial image of a corresponding monitor screen is displayed on the main display area 23.

The alarm occurrence condition display area 27 is an area for informing an operation about an alarm occurrence condition. When an indication label of an alarm (which will be called "ANN" hereinafter) is set in the display area 27 and a pictorial image of the alarm screen is automatically displayed on the display area 23 by the alarm item monitor means 16 at the time of occurrence of an alarm, this indication label ANN is blinked to draw an operator's attention, thus to urge acknowledgement. By allowing an operator to designate the indication label using the input unit 20, the alarm screen is controlled so as to become in conformity with the conditions blinking, turning-on, and turning-off which are presently displayed on the main display area 23. Namely, where there is any alarm screen which has not been yet acknowledged by an operator, a blinking display is conducted. Where all alarm screens are acknowledged, but there is any alarm screen in which the alarm condition is not released, a display with a light is turned on is provided. In addition, where there is no alarm screen placed in an alarm condition, a display with a light is turned off is provided.

As just described above, various commands or instructions from an operator are realized using the input unit 20 on the basis of respective areas 23 to 27 displayed on the tube surface of the display unit 14. The display request for the monitor screen is received or accepted by the command receiving means 21 by designating a label discriminating the main monitor screen within the main monitor screen select area 25 using the input unit 20. Thus, picture information of the main monitor screen is taken out in correspondence with that label from the storage unit by the display request supervisory means 22 and is then displayed on the main display area 23 of the display unit 14 through the display processing means 19. Simultaneously, discrimination labels of all the monitor screens constituting a group of monitor screens to which that main monitor belongs are displayed by the display processing means 19. By allowing the input unit 20 to designate a specified label of the discrimination labels displayed, a pictorial image of a corresponding monitor screen is displayed on the main display area 23 in the same manner as in the case of the main monitor screen. Every time the main monitor screen displayed on the main display area 23 is switched, the sub-monitor screen select area 26 is switched so that a monitor screen constituting a group of monitor screens corresponding to an item to be monitored which is represented by the main monitor screen can be selected. Such switching is carried out by the display processing means 19. Accordingly, once a main monitor screen is selected on the main monitor screen select area 25, i.e., if the item to be monitored is recognized, reference to the monitor screen for that item to be monitored can be designated by the sub-monitor screen select area 26.

How the monitor screen is displayed on the display tube by an operator will be now described wherein main monitor screens representative of different items to be monitored are represented by A and B the sub-monitor screens are represented by ai (i=1 to 5) and bj (j=1, 2), and discrimination labels of respective screens are represented by L(A), L(B), L(ai) and L(bj), respectively.

When L(A) is first designated within the main monitor screen select area 25 by the input unit 20, a main monitor screen A corresponding thereto is displayed in the main display area 23 (CASE I in FIG. 3). At this time, L(A) and L(ai) (i=1 to 5) are displayed on the sub-monitor screen select area 26. When $L(a_2)$ is then designated within the sub-monitor screen select area 26 using the input unit 20, a pictorial image of the sub-monitor screen $a_2$ corresponding thereto is displayed on the main display area 23, and the pictorial image of the main monitor screen A which has been displayed on the main display area 23 until now is displayed at reduced size in the auxiliary display area 24 (CASE II in FIG. 3). Further, when $L(a_4)$ is designated within the sub-monitor screen select area 26 by the input unit 20, a pictorial image of the sub-monitor screen corresponding thereto is displayed in the main display area 23, and the pictorial image of the sub-monitor screen $a_2$ which has been displayed on the main display area 23 until now is displayed at reduced size in the auxiliary display area 24. Thus, the pictorial image of the main monitor screen A which has been displayed in the auxiliary display area 24 is deleted from the display tube (CASE III in FIG. 3).

Then, when it is assumed that L(B) is designated by the input unit 20 within the main monitor screen select area 25 for switching to a new item, to be monitored, the pictorial image of the main monitor screen B corresponding thereto is displayed in the main display area 23. Thus, L(B), $L(a_3)$ and L(bj) (j=1, 2) are instead displayed on the sub-monitor screen select area 26. Further, the pictorial image of the sub-monitor screen $a_4$ which has been displayed on the main display area 23 is displayed at reduced size in the auxiliary display area 24, and the pictorial image of the sub-monitor screen $a_2$ which has been displayed in the auxiliary display area 25 until now is deleted from the tube surface (CASE IV in FIG. 3). In addition, when the auxiliary display area 24 is designated by the input unit 20 for displaying in an enlarged size the pictorial image of the screen $a_4$ having been displayed on the auxiliary display area 24 on the main display area 23 for a second time, the pictorial image of the screen $a_4$ is displayed at an enlarged scale in the main display area 23, and the pictorial image of the main monitor screen B which has been displayed in the main display area 23 until now is instead displayed in the auxiliary display area 24 at reduced size. At this time, since the sub-monitor screen $a_4$ belongs to a group of monitor screens different from the main monitor screen B, L(A) and L(ai) (i=1 to 5) will be instead displayed in the sub-monitor screen select area 26 (CASE V in FIG. 3).

How display on the tube surface is conducted when an alarm has occurred will be now explained. It is now assumed that screens monitoring process variables x and y are represented by x and y and alarm screens, when the process variables x and y reach the alarm condition, are represented by $X_{ANN}$ and $Y_{ANN}$, respectively. The screens X and Y may be either a main monitor screen or a sub-monitor screen. At this time, it is further assumed that the pictorial image of the sub-monitor screen $a_2$ has been displayed in the main display area 23 and the pictorial image of the main monitor screen A has been in the auxiliary display area 24. In this condition, if the process variable x is brought into an alarm condition, since the display request for the monitor screen by an operator has higher priority than the display request for the alarm screen, the pictorial image of the alarm screen $X_{ANN}$ is automatically displayed in the main display area 23 by the alarm item supervisory means 16. Further, for the purpose of allowing an operator to quickly identify the alarm screen, the indication label ANN within the alarm occurrence condition display area 27 blinks. The pictorial image of the sub-monitor screen $a_2$ which has been displayed in the main display area 23 is reduced to the dimension of the auxiliary display area 24, and the pictorial image of the main monitor screen A which has been displayed in the auxiliary display area 24 is deleted from the display tube surface (CASE I in FIG. 4). In, the sub-monitor screen select area 26, a discrimination label for a group of monitor screens to which the alarm screen $X_{ANN}$ belongs is displayed. At this stage, the operator designates the blinking indication label using the input unit 20, thereby to send a command that the alarm screen has been acknowledged to the alarm item supervisory means 16 through the command receiving means 21. Unless such an acknowledgement is conducted, it is impossible to display other monitor screens in the main display area 23. Namely, the pictorial image of the alarm screen concerned is continually displayed.

Figure 4:
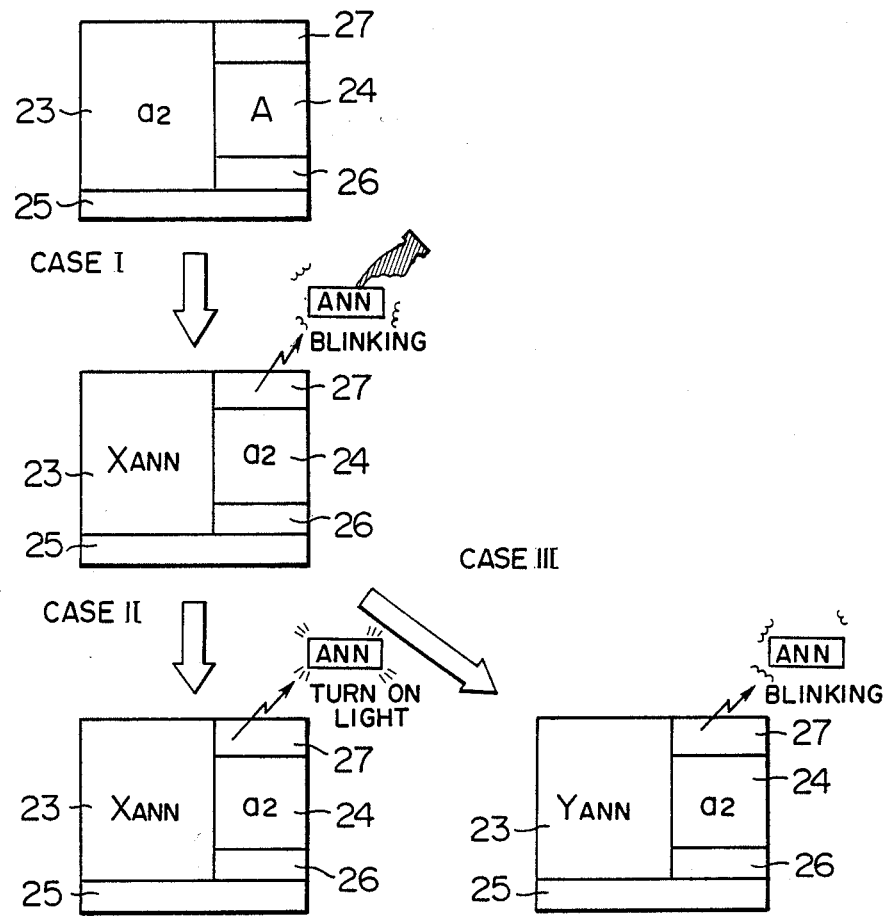
FIG. 4 is an explanatory view showing how display is conducted, when an alarm is produced.

After identification, as long as there is no alarm screen which has not been acknowledged at that time and the alarm condition is not released, the display by the indication label ANN is switched to such a display as to turn on a light (CASE II in FIG. 4). Thus, the pictorial image of other monitor screens based on the display request by an operator may be displayed. On the other hand, if a process variable y, different from the process variable x, is in an alarm condition at the time when acknowledgement is made, the pictorial image of the alarm screen $Y_{ANN}$ is automatically displayed in the display area 23 by the alarm item supervisory means 16 with the indication label ANN blinking. The pictorial image of the alarm screen $Y_{ANN}$ is displayed in the main display area 23 in the same manner as in the case of the monitor screen requested by the operator. However, where the pictorial image of the screen which has been displayed in the main display area until now is that of the alarm screen, the pictorial image of that alarm screen is not displayed at reduced size in the auxiliary display area 24. Accordingly, the pictorial image of the alarm screen $X_{ANN}$ which has been displayed in the main display area 23 is deleted from the display tube surface (CASE III in FIG. 4). In this case, it is needless to say that the discrimination label for the group of monitor screens to which the alarm screen $Y_{ANN}$ belongs is displayed in the sub-monitor screen select area 26. There is no possibility that the pictorial image which has been displayed once as an alarm screen and acknowledged by an operator is automatically displayed as long as that warning condition is released and an alarm condition is not newly established.

The processing of the display request by an operator and the display processing when an alarm has occurred may be accomplished by the input unit 20, the command receiving means 21, the alarm item supervisory means 16, the display request supervisory means 22, and the display processing means 19. An explanation will be made in connection with these processings.

The input unit 20 serves to designate through the tube surface of the display unit 14 the positions of various command sections displayed on the tube surface thereof. The display position of the command section specified by such a designation is delivered to the command receiving means 21 within the computer, thereby making a display request. For the input unit 20, there are touch panel, track ball, keyboard and mouse, etc. inputs and any one of them may be used.

The command receiving means 21 inputs a positional signal on the tube surface output from the input unit 20 to interpret the command section displayed thereon to interpret thereby the content of the command by an operator. Such an interpretation is made with the command section being classified into sections of fixed contents and sections of variable contents depending upon the monitor screen. Namely, for a command in the case of shifting a display from the auxiliary display area 24 to the main display area 23, the display position of the label of the auxiliary display area 24 is a section for command. Such a command section is a fixed command section which does not vary even if the monitor screen displayed changes. Also, the discrimination label displayed in the main monitor screen select area 25 is generally fixed because it is a command section for selecting items of the plant to be monitored, i.e., the main monitor screen. In addition, the label ANN displayed on the warning occurrence condition display area 27 is generally fixed because it is a command value common to the warning screens. For indication labels such that the command section is fixed as stated above, the display position signal on the display tube surface and the command content thereof are stored in advance and correlated with each other, so that they can be interpreted.

On the other hand, for indication labels varying depending upon the monitor screen displayed in the main display area 23 as in the discrimination label displayed on the sub-monitor screen select area 26, the content being displayed presently in the sub-monitor screen select area 26 is input by the display processing means 19 supervising what is displayed in any place on the tube surface, so that it is interpreted in combination with the position signal.

In the case of the command related to the alarm screen, i.e., the command of the alarm occurrence condition display area 27 as a result of interpretation of the command from an operator, the alarm item supervisory means 16 is informed of the command content. In addition, in the case of the command related to the display request for the monitor screen, i.e., the command of the display areas 24, 25 and 26, the display request supervisory means 22 is informed of the command content. It is to be noted that since the command section is determined in advance for the display content, setting may be made according to need also within the main display area 23.

The alarm item supervisory means 16 becomes operative in response to a command by an operator from the command receiving means 21 (a command from the alarm occurrence display area 27). For the processing to be conducted on the premise thereof, such processing is executed to display the pictorial image of the alarm screen in the main display area 23 to output to the display processing means 19 a command for carrying out a blinking display of the alarm indication label ANN in the alarm occurrence condition display area 27. Namely, when the alarm item supervisory means 16 receives from the process variable judgement means 15 information of a process variable which has reached the alarm state, it registers the picture information of the screen monitoring that process variable into the unacknowledged registration Table 17 as the alarm screen, thus to output to the display processing means 19 a display request for that alarm screen and a blinking display request for the indication label ANN of the alarm occurrence condition display area 27. When the alarm item supervisory means 16 receives from the command receiving means 21 an alarm acknowledgement command from an operator, if the picture information of the screen number of the alarm screen is registered in the unacknowledged registration Table 17, it judges that the screen number registered earlier has been acknowledged, in order to cancel the registration of the unacknowledged registration Table 17 and to instead register it into the acknowledged registration Table 18. At the time when the unacknowledged registration Table 17 becomes empty, a request for turning on the display label ANN is output to the display processing means 19. On the other hand, where the alarm item supervisory means 16 receives information for releasing the warning condition from the process variable judgement means 15, it begins cancellation of the corresponding warning screen from the registration of the acknowledged registration Table. At the time when both the unacknowledged registration Table 17 and the acknowledged registration Table 18 become vacant, a request for turning off the indication label ANN is outputted to the display processing means 19.

Then, the display request supervisory means 22 receives display request commands of various monitor screens sent from the command receiving means 21 to discriminate that display command. First, judgement is made whether or not that request is a request for displaying the pictorial image of the monitor screen displayed in the auxiliary display area 24 in the main display area 23 at an enlarged scale. As a result, if so, a request is made to the display processing means 19 to exchange the screen displayed in the main display area 23 and that in the auxiliary display area 24, In contrast, if not so, it is judged that a display request for a monitor screen is newly outputted thus making a judgement as to whether that display request is a display request of the main monitor screen from the main monitor screen select area 25 or a display request of a monitor screen from the sub-monitor screen select area 26. Where that display request is the command from the main monitor screen select area 25, a display request of the selected main monitor screen is outputted to the display processing means 19 and a group of monitor screens set as the sub-monitor screen of the main monitor screen is discriminated by the image information of the monitor system stored in the storage unit 13 to specify a label for discrimination of the monitor screen caused to be displayed in the sub-monitor screen select area 26, thus to output a display request therefor to the display processing means 19. In contrast, where that display request is the command from the sub-monitor screen select area 26, a display request for the selected monitor screen is outputted to the display processing means 19.

The display processing means 19 receives various display requests from the alarm item supervisory means 16 and the display request supervisory means 22 to execute display processing in order to satisfy these display requests. Namely, the display processing means 19 preferentially executes the display request from the alarm item supervisory means 16 when the command from alarm item supervisory means 16 and the command from the display request supervisory means 22 compete with each other, collects and prepares information to be displayed, effects layout of display position on the tube surface of the display unit 14, or the like. Namely, the storage unit 13 stores therein the definition as to what should be displayed for respective plural areas defined on the tube surface of the display unit 14, the definition and the like as to how to move the pictorial image on the tube surface, and holds at all times information as to what is being displayed in any portion on the tube surface at the present time. When the display processing means 19 receives a display request from the alarm item supervisory means 16 or the display request supervisory means 22, it collates the present display condition on the tube surface with the display request content, thus displaying on the display unit 14 the content which satisfies the display request in accordance with the above-mentioned definitions.

Figure 14:
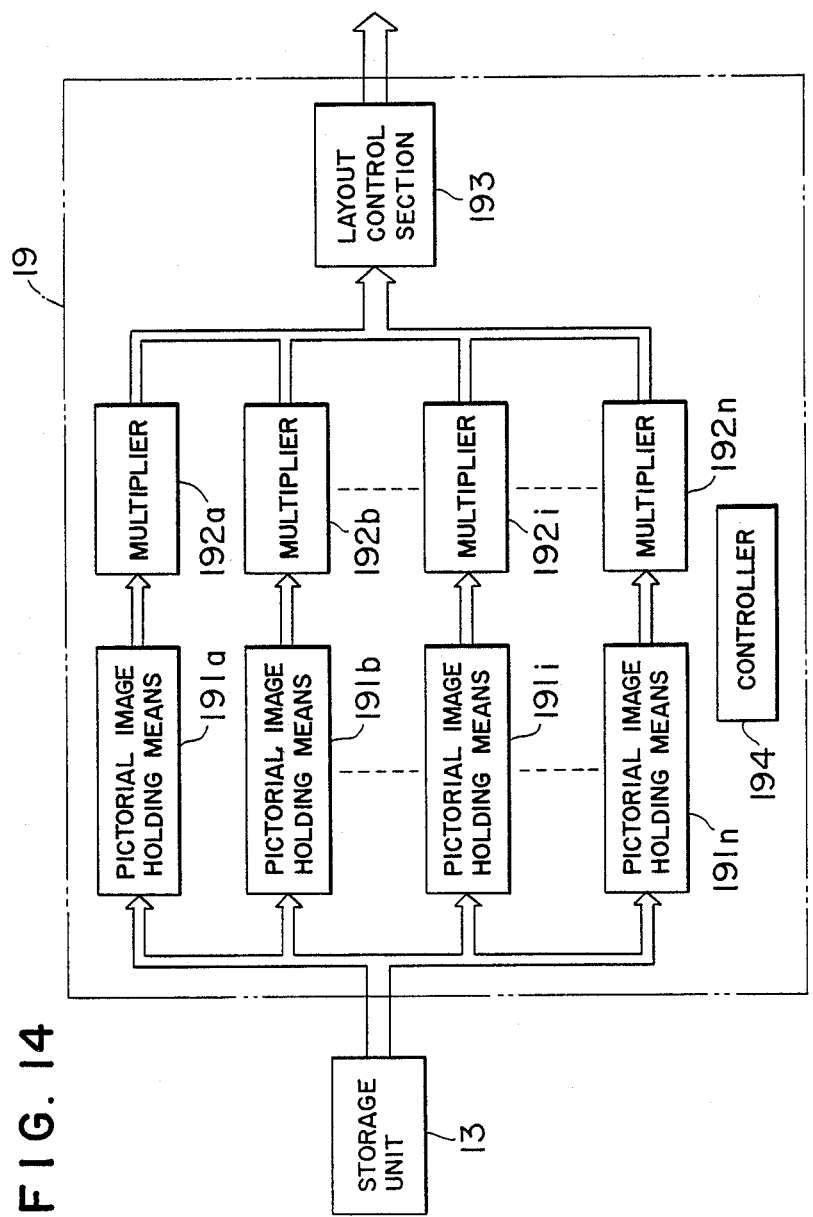
FIG. 14 is a block diagram showing the display processing means.

FIG. 14 shows a construction of the display processing means 19. This means comprises a plurality of pictorial image holding means 191a–191n, plurality of multipliers 192a–192n which provide proper multiplication factors for the outputs of the pictorial image holding means 191a–191n, a layout control section 193 which arranges pictorial images to their desired position within the screen and a controller 194 which executes overall control for the elements within the display processing means 19.

The pictorial image holding means receive and hold pictorial image data which are stored in the storage unit 13. In the storage unit 13, the pictorial data, which is composed of mainly character/image data, for each main/sub screen are allocated to some address. And these data are read out from the storage unit 13 using the readout program and are held in the pictorial image holding means as they are. The multipliers 192a–192n give proper multiplication factors to the pictorial image data according to dimensions of screen area allocated to the data. Then the layout control section gives addresses in the whole screen to the pictorial image data taking account of the multiplication factors.

An explanation will be made in connection with the case where the plant monitoring system according to this invention is applied to the supervision of vibration of a turbine generator. In such an implementation, supervision of vibration is of course conducted using monitor screens. In this case, not only analysis of the vibration is made, but also support factors to pursue the cause of vibration are subject to supervision. Namely, since most abnormal conditions of the turbine appear as vibration when attention is drawn to the supervision of the turbine generator, the bearing vibration of the turbine is significant for the object to be superposed. Since the vibration is taken as a judgement basis when any abnormal condition occurs, analysis of the vibration itself is first required. For example, vibration first analyzed on-line with amplitude, phase and frequency which can be said to be three major elements of vibration that are parameters to determine items to be monitored so that changes in the analytical data can be monitored with the number of turbine revolutions and/or load being as parameters. Further, for information to support the pursuit of the cause of vibration, factors directly related to the turbine rotor such as at least a bearing feed oil temperature, a bearing metal temperature, a bearing return oil temperature, a differential expansion of the turbine, or thermal stress, etc. are set for the objects to be monitored, thus to determine items to monitored so that changes in the factors can be monitored.

For items to be monitored for analyzing vibration, five items to be monitored are set: monitoring of vibration frequency, monitoring of vibration amplitude and phase angle, monitoring of vibration amplitude according to load changes, monitoring of vibration amplitude according to changes in rotational frequency, and rub check monitoring. In addition, for items to be monitored which support the pursuit of the vibration cause, five items to be monitored are set: monitoring of bearing metal temperature/bearing return oil temperature, monitoring of bearing feed oil temperature, monitoring of differential expansions, monitoring of thermal stress, and monitoring of vacuum elevation. For these ten items to be monitored, several sub-monitor screens are provided.

Figure 5:
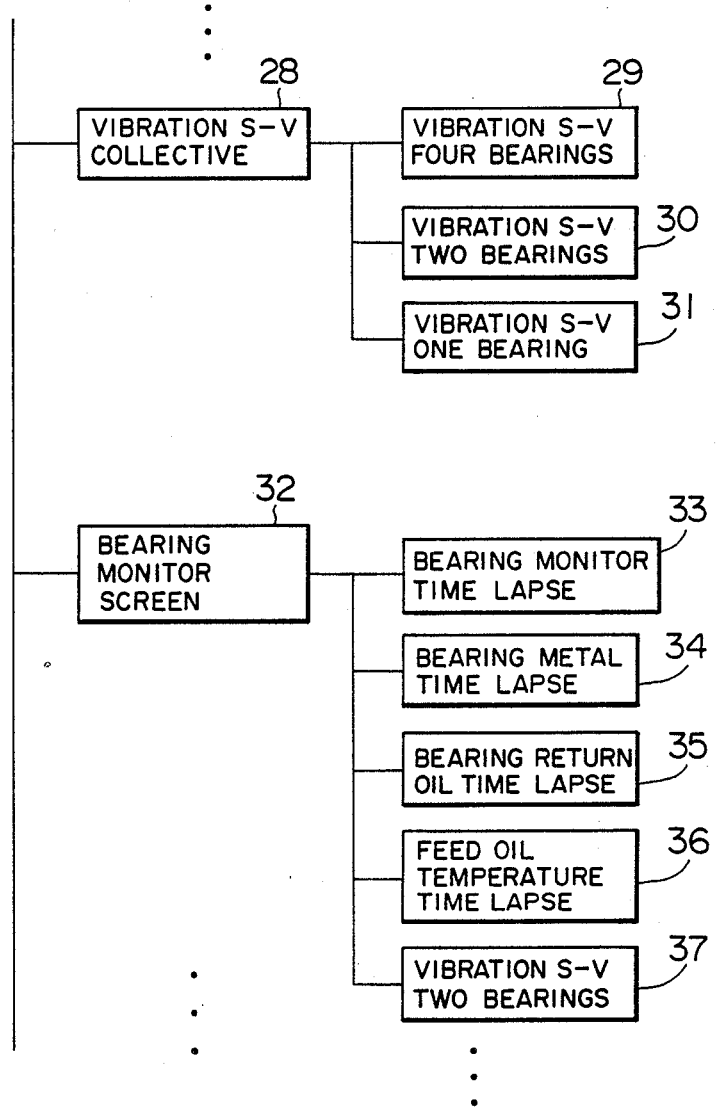
FIG. 5 is an explanatory view showing the configuration system of groups of monitor screens for the vibration S-V and the bearing monitor.
Figure 8:
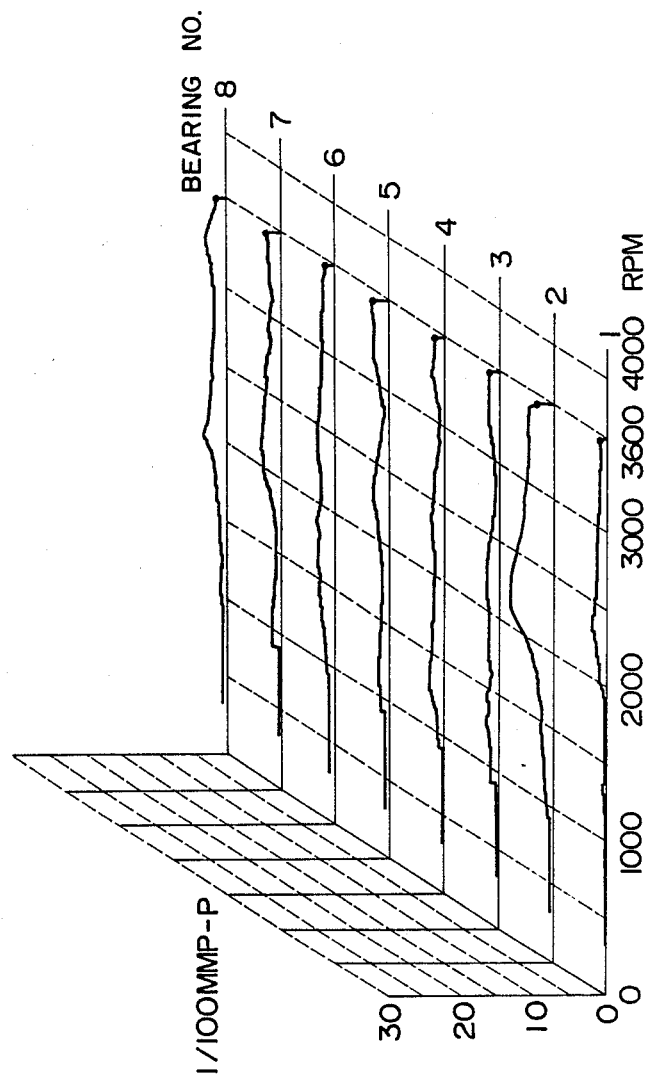
FIG. 8 is an explanatory view of a vibration S-V collective screen.

For brevity of description, an explanation will be made by the example of monitoring of vibration amplitude according to changes in rotational frequency (which will be called vibration S-V hereinafter), and monitoring of bearing metal temperature/bearing return oil temperature (which will be called bearing monitor hereinafter). In this case, the configuration of the monitor system image of a group of monitor screens for the vibration S-V and the bearing monitor is assumed as shown in FIG. 5. As shown in FIG. 8 described later, the main monitor screen 28 for the vibration S-V is a monitor screen which displays three-dimensionally the vibration amplitude according to changes in rotational frequency from the first bearing up to the eighth bearing, thus to roughly grasp or recognize changes in the entire vibration amplitude. This main monitor screen is called the vibration S-V collective screen hereinafter. In order to effect mutual comparison between bearings or monitoring of individual bearings by using sub-monitor screens with respect to the main monitor screen, sub-monitor screens provided for arbitrarily selecting one bearing, two bearings and four bearings from these eight bearings to be monitored. These sub-monitor screens will be called the vibration S-V four bearing screen 29, the vibration S-V two bearing screen 30, and the vibration S-V one bearing screen 31 depending upon the number of bearings displayed within the same monitor screen.

On the other hand, the main monitor screen 32 for the bearing monitor serves to monitor current values of the bearing metal temperature and the bearing return oil temperature from the first bearing up to the eighth bearing. This main monitor screen 32 is a monitor screen for grasping the present state of bearings at a glance. In order to monitor changes with a lapse of time for individual bearings, there are provided, for submonitor screens with respect to the main monitor screen 32, a bearing monitor time lapse screen 33 to select a single specified bearing to monitor changes with lapse of time of the bearing metal temperature and the bearing return oil temperature, a bearing metal time lapse screen 34 to select a single specified bearing to monitor changes with lapse of time of the bearing metal temperature, and a bearing return oil time lapse screen 35 to select a single specified bearing to individually monitor changes with lapse of time of the bearing return oil temperature. Further, an oil supply temperature time lapse screen 36 for monitoring changes with lapse of time of the bearing supply oil temperature closely related to the bearing metal temperature/the bearing return oil temperature is provided. In addition, when any abnormal condition is observed in the temperature condition, the vibration S-V two bearing screen 37 which is the vibration screen is set as the sub-monitor screen for the bearing monitor for monitoring vibration.

Figure 6:
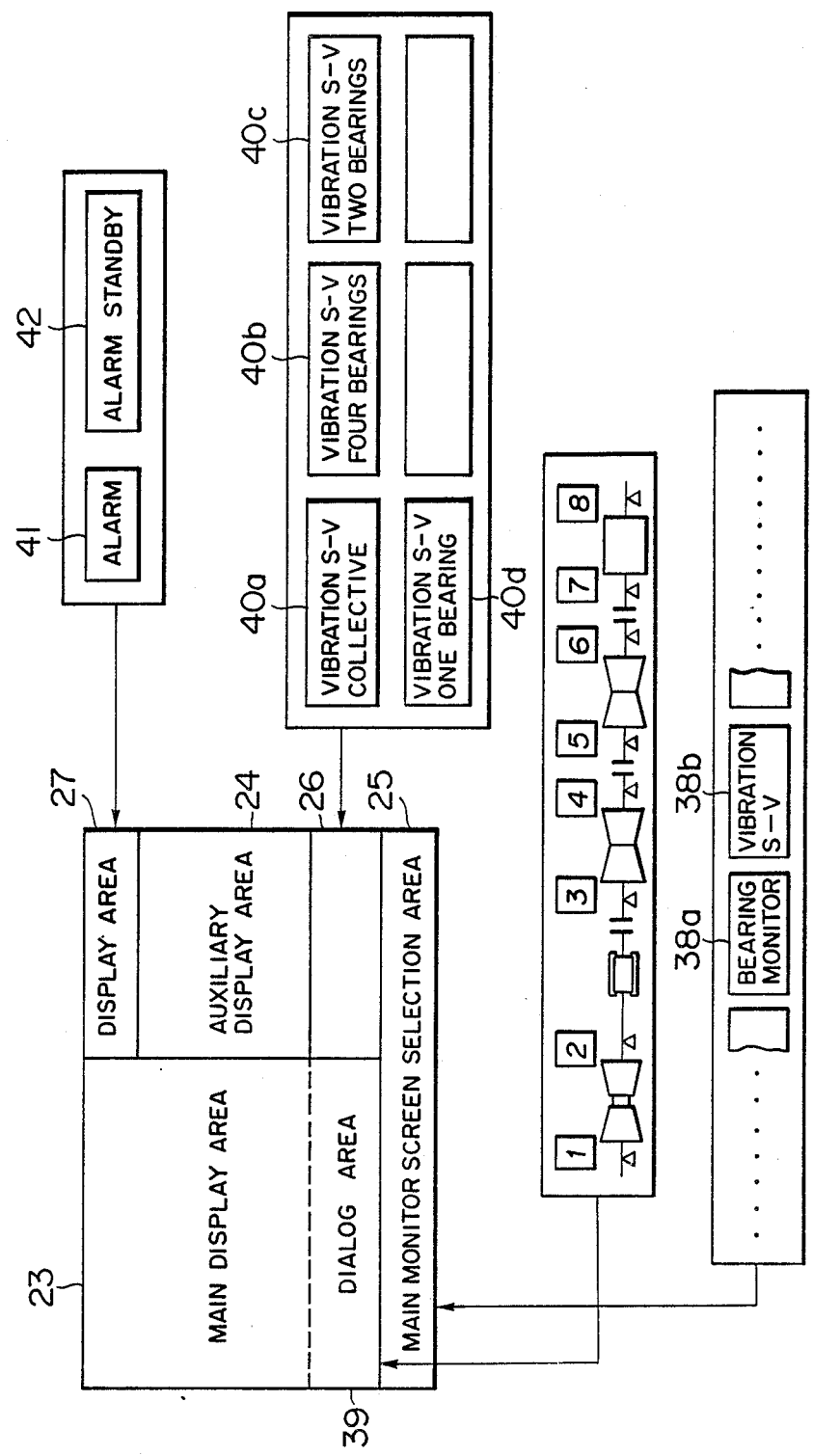
FIG. 6 is an explanatory view showing the configuration of a display area on the display tube in the display unit.

FIG. 6 is an explanatory view showing the tube surface of the display unit 14 when the pictorial image of the vibration S-V collective screen is displayed as the main monitor screen in the case supervising turbine vibration. In the main monitor screen select area 25 of the display unit 14, the discrimination label 38 of the above-mentioned items to be monitored will be displayed. It is now assumed that the discrimination label 38b for the vibration S-V is selected. Thus, the pictorial image of the main monitor screen for the vibration S-V as shown in FIG. 8 is displayed in the main display area 23. A bearing select area 39 is provided in a portion of the main display area 23 as an interactive area, thus making it possible to select an arbitrary bearing from the first to the eighth bearings of the turbine rotor bearings. Namely, in the bearing select area 39, the pictorial image of a command section for specifying a bearing to be displayed on the vibration S-V four bearing screen 29, the vibration S-V two bearing screen 30, and the vibration S-V one bearing screen 31. Namely, as shown in FIG. 6, a frame diagram is displayed in the bearing select area 39 by the image for positioning of bearings and numeric values of 1 to 8 of the bearing number are set as a command section for selection of bearings. By designating the numeric portion using the input unit 20, a desired bearing is selected.

In the sub-monitor screen select area 26, a command section for selecting the screen displayed in the main display area, i.e., a specified screen of a group of monitor screens of items to be monitored to which the vibration S-V collective screen 28 belongs is displayed as discrimination label 40.

On the other hand, two command sections of alarm label 41 and alarm standby label 42 are displayed in the warning occurrence condition display area 27, thus to supervise the occurrence condition of an alarm by a combination of blinking, turning on and turning off of the alarm label 41 and turning on and turning off of the alarm standby label 42.

Figure 7:
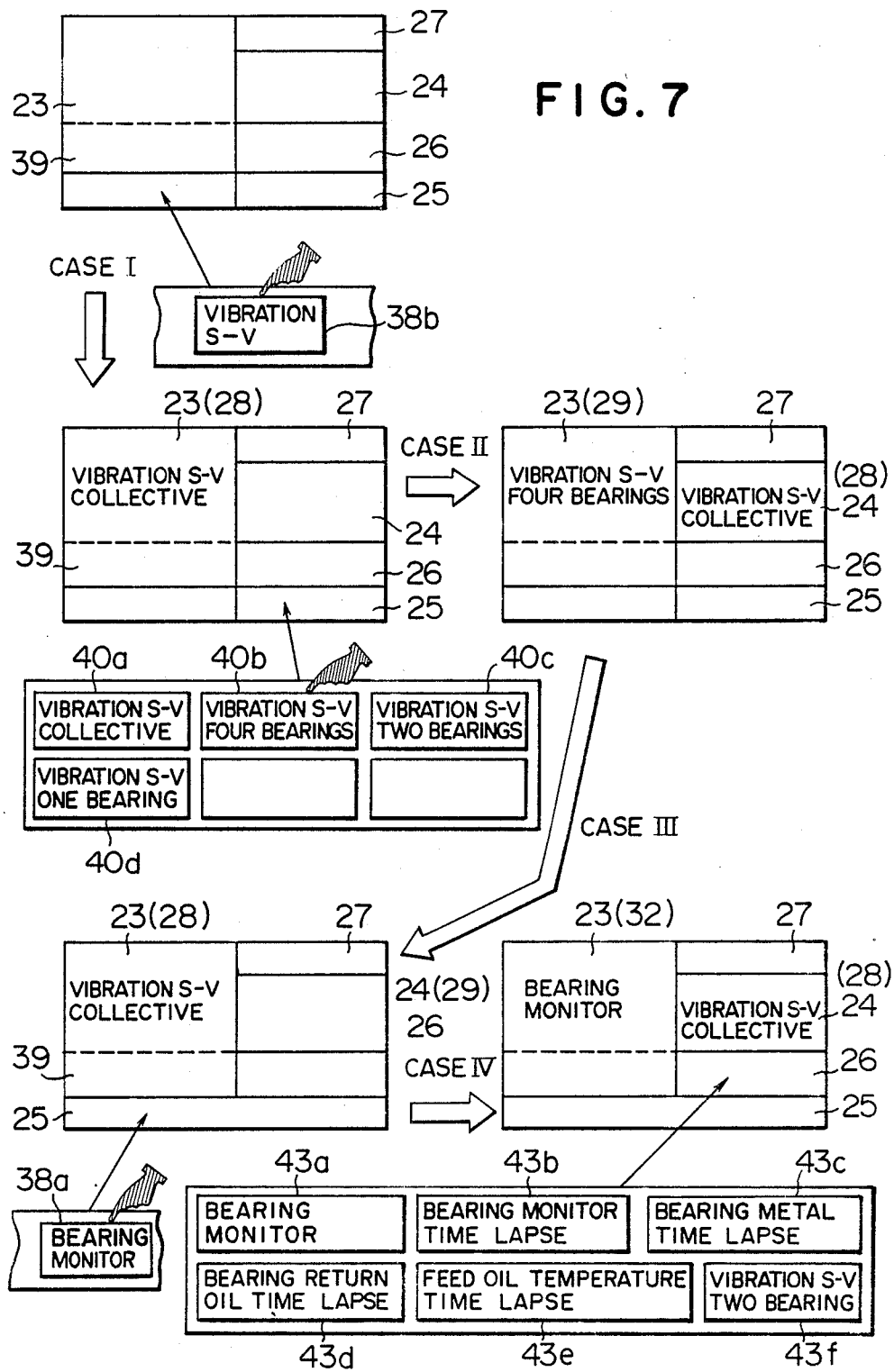
FIG. 7 is an explanatory view showing how a pictorial image of a monitor screen is displayed in the supervision of turbine vibration.

How display is conducted in the case of supervision of the turbine vibration will be explained with reference to FIG. 7. First, when the discrimination label 38b for the vibration S-V of items to be monitored is designated in the main monitor screen select area 25 using the input unit 20, the pictorial image of the vibration S-V collective screen 28 corresponding thereto is displayed in the main display area 23. In addition, the vibration S-V collective 40a, the vibration S-V two bearings 40c and the vibration S-V one bearing 40d which are discrimination labels for a group of monitor screens to which the item to be monitored belongs are displayed in the same diameter vibration S-V select area 26 (CASE I in FIG. 7). FIG. 8 shows an example of the display of the vibration S-V collective screen 28. It is seen from this figure that the behavior of amplitude of the first bearing to the eighth bearings can be roughly grasped.

Then, when the label 40b of the vibration S-V four bearings of identification labels of the same system monitor screens is designated, the vibration S-V collective screen 28 which has been displayed in the main display area 23 until now is displayed at a reduced scale in the auxiliary display area 24. Then, the pictorial image of the screen displayed in the display area 23 is switched to the vibration S-V four bearing screen 29 which is a new monitor screen (CASE II in FIG. 7). The vibration S-V four bearing screen 29 is the monitor screen adapted so that four bearings requested by an operator among the first to the eighth bearings can be monitored on the same screen. When the discrimination label 40b of the vibration S-V four bearings is selected from the sub-monitor screen select area 26, an operator sets four bearings in the bearing select area 39 of the main display area 23 in accordance with the standard shown in FIG. 9 with the bearing having the largest amplitude being as a center among the first to the eighth bearings.

In FIG. 9, double circular mark ◎ denotes the bearing with the largest amplitude. This figure shows that when it is seen that, e.g., the second bearing is the bearing with the maximum amplitude by the vibration S-V collective screen 28 (FIG. 8) which is the main monitor screen, the second bearing must be selected at first. Namely, when the vibration S-V one bearing screen 31 (discrimination label 40d) is selected as the sub-monitor screen, two bearings of the bearing (second bearing) labeled double circular mark ◎ for maximum amplitude and the bearing (first bearing) labeled with a triangular △ mark which has the greatest influence thereon are selected. When the vibration S-V four bearing screen 29 (discrimination label 40b) is selected as the sub-monitor screen the bearing (second bearing) labeled with a double circular mark ◎ for maximum amplitude, the bearing (first bearing) labeled with a triangular mark △ which has the greatest influence thereon, and bearings (third and fourth bearings) labeled with a circular mark ○ which have smaller influence thereon are selected.

Such a bearing select area 39 is not displayed at all times, but is displayed only when the monitor screen which can make a selection of every bearing as stated above is displayed. The above-mentioned display processing is conducted in accordance with the processing by the display processing means 19.

Figure 10:
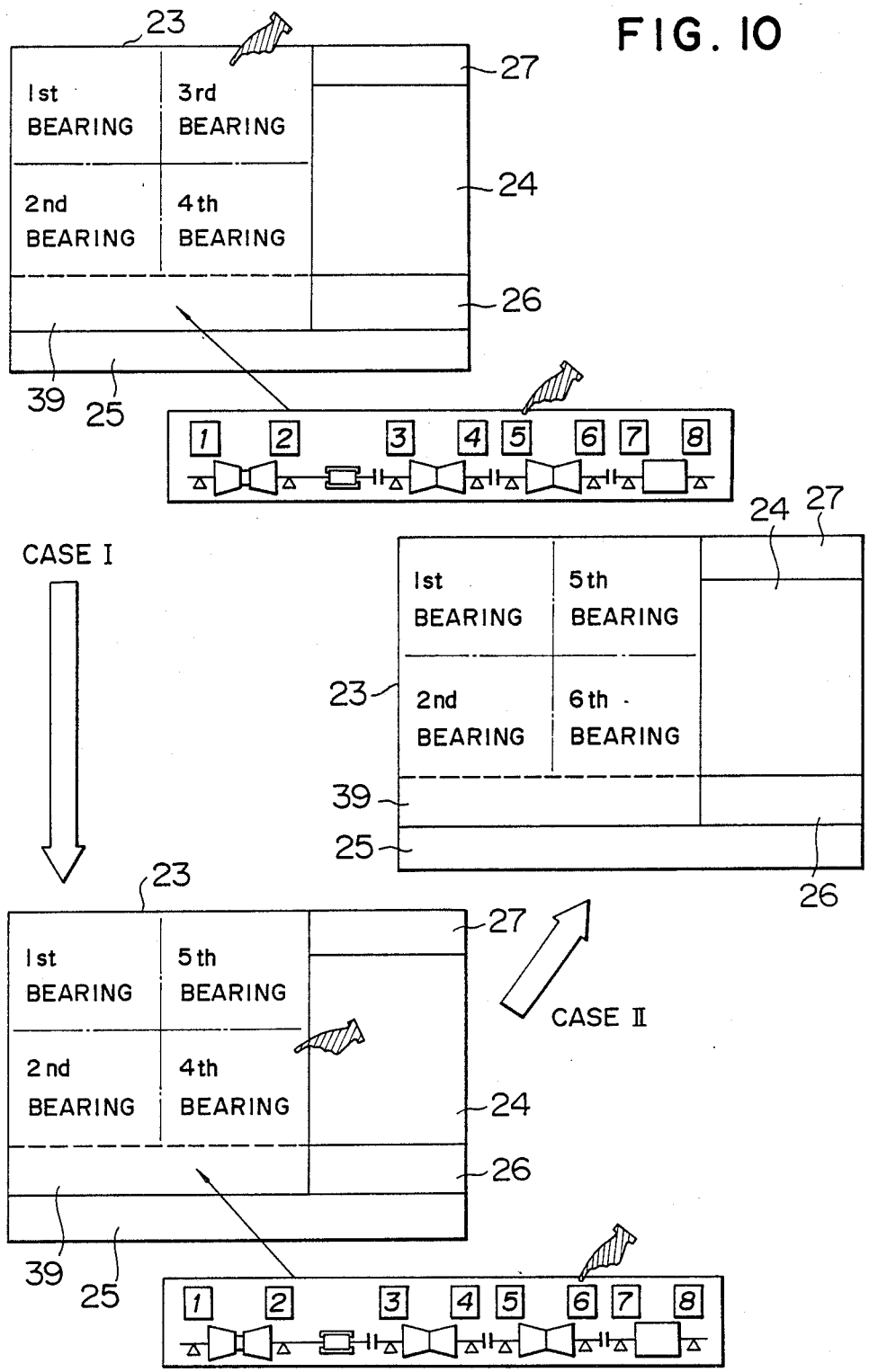
FIG. 10 is an explanatory view showing the procedure for bearing selection.

How bearings are switched will be explained with reference to FIG. 10. It is now assumed that the vibration four bearings screen 31 is selected and four bearings, such as the first up to the fourth bearing, have been displayed. Such bearings are displayed on four divisional areas obtained from the main display area 23, respectively. In this condition, in the case of monitoring the behavior of the fifth and sixth bearings instead of the third and fourth bearings, the first step is to designate the bearing number 5 in the bearing select area 39 of the main display area 23, and thereafter designate where it is displayed in the main display area 23. Assuming now that the fifth bearing is displayed in place of the third bearing, the area on which the screen for the third bearing of the main display area 23 is designated by the input unit 20. Thus, data indicative of the fifth bearing is displayed on a portion where the third bearing has been displayed (CASE I in FIG. 10). Similarly, the bearing number 6 is designated in the bearing select area 39. Subsequently, when the bearing number 6 is designated in the display area 39 for the fourth bearing of the main display area 23 and the display area for the fourth bearing of the main display area 23 is designated, data indicative of the sixth bearing is displayed in place of the fourth bearing. Thus, data indicative of four bearings of the first, the second, the fifth and the sixth bearings are displayed on the screen (CASE II in FIG. 10). The selection of bearings is made by a two stage designation comprising selecting the number of a bearing to be monitored by the bearing select area 39 and designating where it is displayed in the main display area 23.

This applies in the same way to monitor screens capable of selecting bearings. It is to be noted that since only data indicative of one bearing to be monitored in detail is displayed within the screen therefor, it is sufficient to select only the bearing number in the main display area 39. The above-mentioned function is accomplished by the input unit 20, the command receiving moans 21, the display request supervisory means 22, and the display processing means 19.

Then, under conditions where the pictorial image of the vibration S-V four bearing screen 29 is displayed in the main display area 23 and the pictorial image of the vibration S-V collective screen 28 is displayed in the auxiliary display area 24, when the auxiliary display area 24 is designated by the input unit 20, the pictorial image of the vibration S-V collective screen 28 is displayed at an enlarged scale for a second time, and the pictorial image of the vibration S-V four bearing screen 29 which has been displayed until now is instead displayed at a reduced scale in the main display area 23. Simultaneously with this, the display of the bearing select area 39 disappears (CASE III in FIG. 7).

Further, when the discrimination label 38a of the bearing monitor which is the item to be monitored is designated by the main monitor screen select area 25, the vibration S-V collective screen 28 which has been displayed in the main display area 23 is displayed at a reduced scale, and the vibration S-V four bearing screen 29 which has been displayed in the auxiliary display area 24 disappears from the display tube. Moreover, the bearing monitor screen 32 which is the corresponding main monitor is displayed in the main display area 23. In addition, the system screen select area 26 is also switched to the bearing sub-screen which is the item to be monitored. Thus, for the group of monitor screens belonging to that item to be monitored, indication labels indicative of the bearing monitor time lapse 43b, bearing metal time lapse 43c, bearing waste oil time lapse 43d, oil supply temperature time lapse, and vibration S-V two bearing are displayed (CASE IV in FIG. 7).

When an alarm occurs, the alarm label 41 of the warning occurrence condition display area 27 blinks and thus the pictorial image of the alarm screen is displayed in the main display area 23. If the pictorial image of the screen which has been displayed until now corresponds to that displayed according to requirement by an operator, the pictorial image of that screen is displayed at a reduced scale on the auxiliary display area 24. Since the alarm screen displayed in the main display area 23 is required to be identified for an operator, the designation of blinking alarm label 41 results in a command for identification. As long as identification is not conducted, requesting display of other monitor screens, or calling into the main display area 23 the monitor screen displayed on the auxiliary display area 24 cannot be accomplished. In addition, since a plurality of alarms may occur at a time, the alarm label 41 is blinked and the alarm standby label 42 is turned on in such a case.

Figure 11:
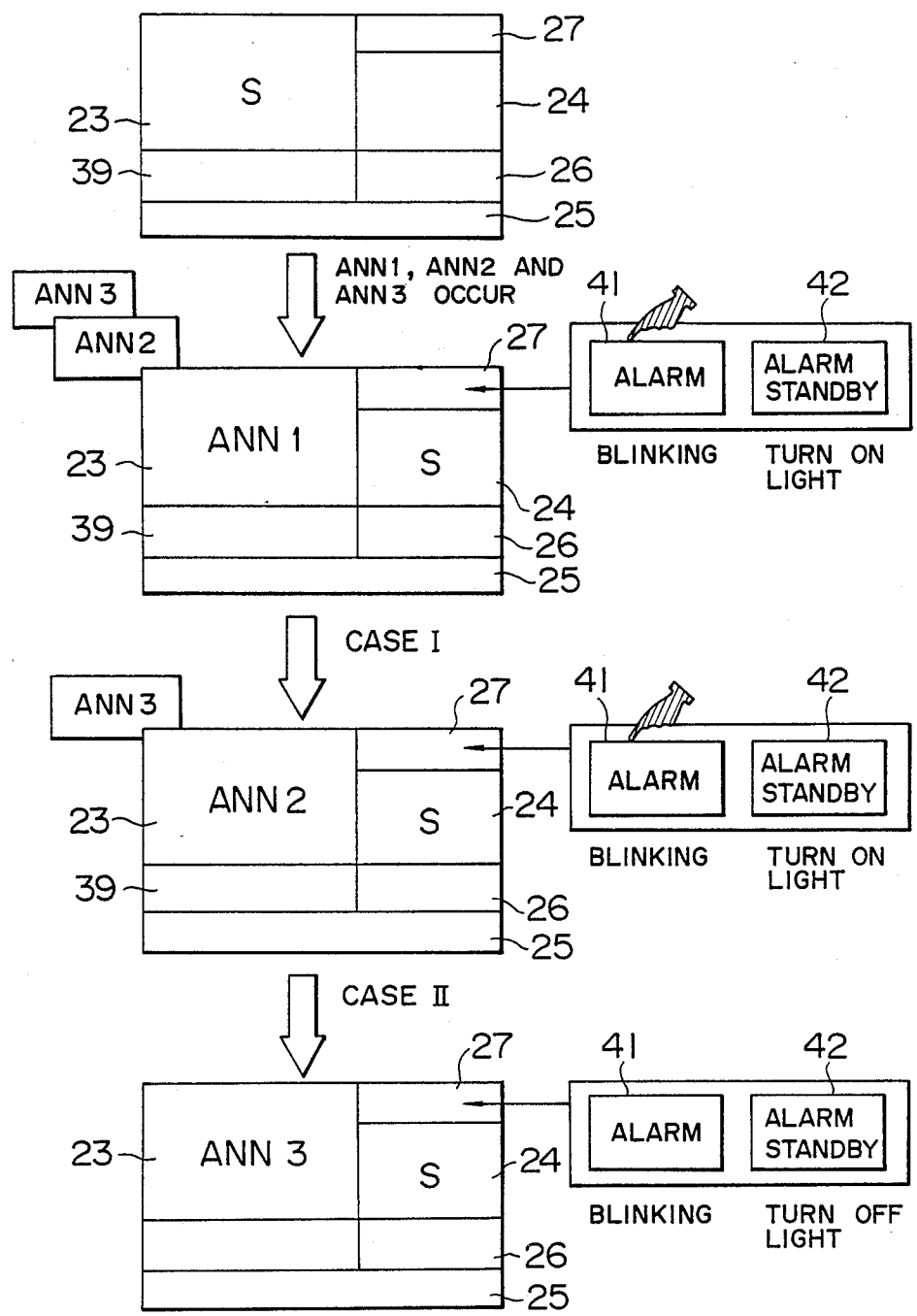
FIG. 11 is an explanatory view showing how display is conducted when an alarm is produced when there is the supervision of turbine vibration.

An explanation will be made in connection with the case where a plurality of alarms have occurred at the same time with reference to FIG. 11. It is now assumed that three alarms have occurred at the same time and alarm screens corresponding thereto are represented by ANN1, ANN2 and ANN3. It is further assumed that the alarm screen according to an operator's request which was displayed before occurrence of the alarm is represented by S. First, the alarm label 41 blinks and the alarm standby label is turned on. In addition, ANN1 and S are displayed in the main display area 23 and the auxiliary display area 24, respectively. When an operator identifies the blinking alarm occurrence to designate the alarm label 41, ANN1 is considered to be identified and ANN2 is then displayed in the main display area 23. Since ANN1 is not the screen according to an operator's request, there is no possibility that it is displayed in a reduced scale in the auxiliary display area 24 and therefore it is deleted from the display tube surface. At this time, the alarm label 41 and the alarm standby label 42 are in the same state as in the previous state (CASE I in FIG. 1).

Further, when the blinking alarm label 41 is designated, ANN2 is considered to be acknowledged, so that ANN3 is instead displayed in the main display area 23. Simultaneously with this, since there is no alarm screen which is not displayed on the display tube surface at this time, the alarm standby label 42 is turned off (CASE II in FIG. 11). While the alarm label 41 remains blinking, such a label is designated, whereby ANN3 is acknowledged and thus the alarm label 41 changes to the turn-on mode. It is needless to say that the above-mentioned processing at the time of occurrence of an alarm is accomplished by the input unit 20, the command receiving means 21, the alarm items supervisory means 16, and the display processing means 19.

At the time when the alarm label 41 has finished blinking, a request from an operator through the display request supervisory means 22 can be received. The turning-on of the alarm label 41 shows that there exists a screen which has been acknowledged by an operator, but from which the alarm state has not been yet released. In the case of taking out only these alarm screens, when blinking alarm labels 41 are designated, these alarm screens are cyclically displayed in the main display area 23 for every designation. This is realized by utilizing the acknowledged registration Table 18 in which picture information of alarm screens which have been acknowledged by an operator, but from which the alarm state has not been released are registered, thus outputting pictorial images of screens in order of picture information registered therein.

The content of information of the alarm occurrence condition for an operator is based on the combination of blinking, turning-on and turning-off of the alarm label 41 and turning-on and turning-off of the alarm standby label 42 is shown in FIG. 12.

In this example, calling of the identified alarm screen into the main display area 23 by designating the alarm label 41 turning on can be said to be displaying of a screen according to an operator's request, and here is employed an arrangement such that the alarm screen is not displayed once at a reduced scale in the main display area 24 for clarifying the operation of the system. It is to be noted that screens, which are selected by an operator by utilizing the main monitor screen select area 25 or the sub-monitor screen select area 26 and then displayed in the main display area 23 even if they are the same screen, may be displayed once at a reduced scale in the auxiliary display area 24.

Setting of alarm screens will be made as follows. For instance, where a limit value of an alarm is provided in the vibration S-V and thus this is assumed as the item to be monitored, if all the screens monitoring that process variable are simply considered to be alarm screens, the vibration S-V collective screen and the vibration S-V N bearing screen (N=1, 2, 4) are all subject to the alarm screen for the vibration S-V. However, this only allows an operator to be troublesome. When the characteristic of the vibration is taken into consideration, it is seen that there is employed a structure such that the first and second bearings, the third and fourth bearings, the fifth and sixth bearings, and the seventh and eighth bearings are affected by each other, respectively. Accordingly, where one bearing reaches the alarm range, it is effective to display two bearings, i.e., that bearing and a bearing paired therewith. Thus, such a case is supervised by the vibration S-V two bearing as the alarm screen. Since there are several instances where one object to be monitored, i.e., process variable is monitored by many screens as stated above, also in the case of setting the alarm screen, one optimum monitor screen is selected to be used as a screen for signaling an alarm by taking into account the characteristic of the process variable placed in the alarm state. In addition, also where the alarm screen is displayed in the main display area 23, the title of the monitor screen for items to be monitored to which the alarm screen belongs is displayed in the sub-monitor screen select area 26 in the same manner as stated above. Accordingly, after acknowledgement of the alarm screen is conducted, it is possible to designate the sub-screen select area to switch the screen, thus to monitor the cause of that alarm, influence on others, or the like. As previously described, by systematization of the main and sub-monitor screens every item to be monitored exhibits a great effect in this embodiment. The alarm screen which signals a process variable which has reached an alarm value is first automatically displayed in the main display area to which the operator pays attention. Thus, information answering "what is the cause . . . ?" is presented.

Figure 13:
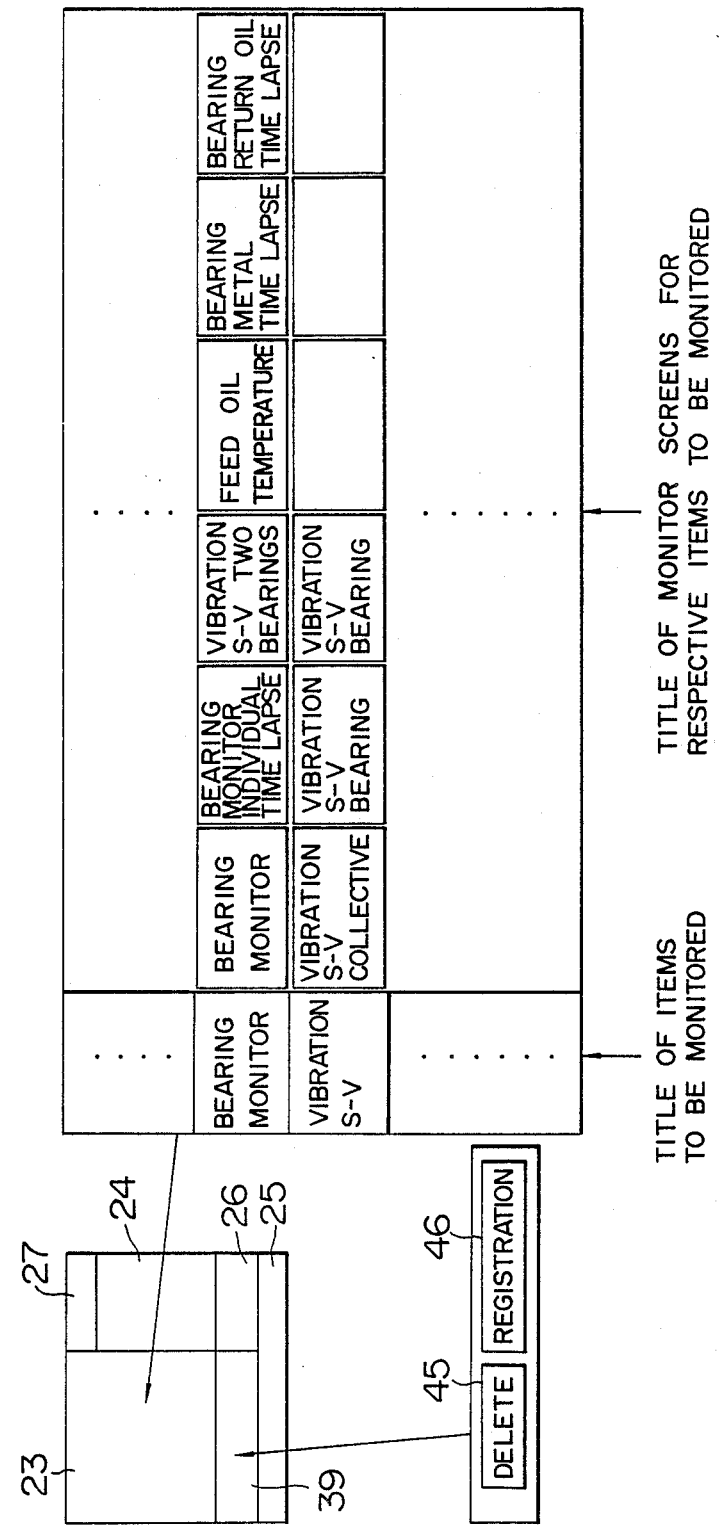
FIG. 13 is an explanatory view showing registration/deletion of a monitor screen.

While the relationships between the main monitor screens and the sub-monitor screens, i.e., the supervisory system images are stored in advance every item to be monitored in the above-mentioned embodiment, a discrimination label of, e.g. all screen lists may be provided in the main monitor screen select area 25 to select this to thereby display, as a list, discrimination labels of a group of monitor screens for every item to be monitored as shown in FIG. 13, thus to make an alteration to the monitor system image. To realize this, command sections for a deletion label 45 and a registration label 46 are set in the bearing select area 39 and then displayed thereon, thus to effect rearrangement and/or deletion of monitor screens within the screen for displaying all screens as a list. Namely, in the case of effecting deletion, there is employed a method to designate the deletion label 45, thereafter to designate the discrimination label for a monitor screen needed to be deleted. Further, in the case of registering a sub-monitor screen defined as an item to be monitored into another item to be monitored, there is employed a method to designate the registration label 46 to designate a discrimination label of a sub-monitor screen needed to be registered to further designate a discrimination label of the item to be monitored, into which that sub-monitor screen is registered. By freely or desirably combining groups of monitor screens with each other, the optimum monitor system can be constructed for use in conformity with the actual plant operation. Also, it is needless to say that where there is a need to additionally register a completely new monitor screen, this is carried out after data indicative of that monitor screen is stored in the storage unit 13.

Since it has been an object to carefully carry out the supervision of the turbine vibration in the above-mentioned explanation, analysis thereof has been made using three parameters, i.e., frequency, phase and amplitude for the vibration taken as an example, so that the detailed supervision may be conducted. Accordingly, where any abnormal condition, occurs, this supervising or monitoring system can grasp a sign of the abnormal condition before the process variable reaches a limit value set in the prior art. In addition, there may be employed a method to accumulate achievement data and to set a cautionary value to draw the attention of an operator before the alarm state is reached, thus to automatically display that cautionary screen from the system when the analytical data enters into the cautionary value. In this case, an area for display of the cautionary screen is exclusively provided on the tube surface. From the viewpoint of an early discovery of an abnormal condition, importance is attached more to caution than alarm, thus to conduct only necessary and minimum handling as the alarm screen and to set cautionary values based on the achievement data of the analytical level, whereby the degree of support for an operator is increased and the accuracy of supervision is further improved.

As described above in detail, the monitor screen system according to this invention is constructed in consideration of correlations between process variables to be supervised, thereby making it possible to provide information of monitoring means or groups of monitor screens to be closely watched by an operator. This exhibits an increased opportunity for early discovery of the cause of an abnormal condition. Further, one display unit is divided into a plurality of areas and thus all requests given by an operator can be visually satisfied on the screen of the display tube. Accordingly, the plant supervising equipment of this invention has such improved operation that continuous supervision is realized in consideration of the coexistence of information automatically output from the system and a command based on a request from an operator, thus providing an improvement in the supervision efficiency, particularly, since a command section for receiving an operator's request without setting a menu screen is set on the display tube, information that an operator desires to obtain can be readily displayed.

What is claimed is:

1. A plant monitoring system comprising:
   storage means for storing predetermined pictorial data of a display screen, process variables obtained from a plant to be controlled at every control cycle, data concerning a relationship between main monitor screens which display schematic information necessary for monitoring said plant and submonitor screens which display detailed contents of said main monitor screens and said pictorial data for selecting an operation requirement;

input means for inputting operator's requests including a request for changing display contents displayed on said display screen;

display means having said display screen including:

(a) a main display area for usually displaying one of a plurality of pictorial images of said main monitor screens and for displaying related ones of said sub-monitor screens in response to said operator's requests and for displaying an alarm screen when an alarm occurs;

(b) an auxiliary display area for displaying a pictorial image which has been displayed on said main display area up to now in response to said operator's request for changing display contents in said main display area or in response to occurrence of said alarm;

(c) a main monitor screen selection area for displaying a command for selecting a main monitor screen relating to an item to be monitored which has been displayed on said main display area;

(d) a sub-monitor screen selection area for displaying labels for selecting one of said sub-monitor screens having a relation to a monitor screen which has been displayed on said main display area;

(e) an alarm occurrence display area for displaying a command for alarm processing; and controlling means for receiving said process variables and storing said process variables in said storage means, interpreting received commands inputted from said input means and allocating information read out from said storage means with necessary alarm information on said main and sub-monitor screens of said display means.

2. A plant monitoring system according to claim 1, said controlling means comprising:

process variable input means for inputting process variable signals from said plant;

process variable judgement means for outputting an alarm occurrence command when a specified process variable which is important in monitoring said process variables received by said process variable input means exceeds a predetermined normal range;

alarm item supervisory means for reading out necessary data indicative of items to be supervised from said storage means on the basis of said alarm occurrence command to reconstitute data for displaying a command for alarm processing in said alarm occurrence display area;

display processing means for arranging display contents using an output from said storage means and an output from said alarm item supervisory means; and command receiving means for receiving a processing request by an operator to output a control signal to said alarm item supervisory means and said display processing means.

3. A plant monitoring system according to claim 2, said display processing means comprising a magnification computation unit for determining display magnifications of respective ones of said screens, and a layout control unit for arranging said respective ones of said screens whose sizes are determined by said magnification computation unit at predetermined positions, respectively.

* * * * *